US009942233B2

(12) United States Patent
Jungck et al.

(10) Patent No.: US 9,942,233 B2
(45) Date of Patent: *Apr. 10, 2018

(54) IDENTIFICATION OF PATTERNS IN STATEFUL TRANSACTIONS

(71) Applicant: CloudShield Technologies, Inc., Sunnyvale, CA (US)

(72) Inventors: Peder J. Jungck, San Carlos, CA (US); David Helms, Arlington, VA (US)

(73) Assignee: CloudShield Technologies, Inc., Sunnyvale, CA (US)

( * ) Notice: Subject to any disclaimer, the term of this patent is extended or adjusted under 35 U.S.C. 154(b) by 223 days.

This patent is subject to a terminal disclaimer.

(21) Appl. No.: 14/846,724

(22) Filed: Sep. 4, 2015

(65) Prior Publication Data

US 2015/0381627 A1    Dec. 31, 2015

Related U.S. Application Data

(63) Continuation of application No. 13/958,174, filed on Aug. 2, 2013, now Pat. No. 9,166,942, which is a
(Continued)

(51) Int. Cl.
*H04L 1/00* (2006.01)
*H04L 29/06* (2006.01)
*H04L 12/58* (2006.01)
*H04W 4/14* (2009.01)

(52) U.S. Cl.
CPC .............. *H04L 63/10* (2013.01); *H04L 51/12* (2013.01); *H04L 51/30* (2013.01);
(Continued)

(58) Field of Classification Search
USPC ................. 370/229, 230, 232, 235, 236, 401
See application file for complete search history.

(56) References Cited

U.S. PATENT DOCUMENTS 8,526,306 B2 * 9/2013 Jungck ............... H04L 63/0245
370/230
8,666,043 B2 * 3/2014 Ray ..................... H04M 1/247
379/93.23
(Continued)

OTHER PUBLICATIONS

Cloudshield Product Datasheet "CloudShield PacketWorks™ IDE", © 2007 CloudShield Technologies, Inc., 2 pages.
(Continued)

*Primary Examiner* — Kwang B Yao
*Assistant Examiner* — Nguyen Ngo
(74) *Attorney, Agent, or Firm* — Lempia Summerfield Katz LLC

(57) ABSTRACT

A system for the identification of patterns in stateful transactions may include a message interceptor, a message pattern processor, a message handler, and a memory. The message interceptor may be operative to intercept messages transmitted by a first device over a network to a recipient. The message interceptor may be operative to intercept the messages before the messages are received by the recipient. The message pattern processor may be operative to add the message to a message pattern and store the message pattern in a memory. The message pattern processor may compare the message pattern to a plurality of exemplary message patterns and identify when the message pattern matches at least one of the exemplary message patterns. The message handler may be operative to determine an action to take with respect to the message based on the at least one matching exemplary message pattern identified by the message pattern processor.

19 Claims, 10 Drawing Sheets

Related U.S. Application Data continuation of application No. 12/621,810, filed on Nov. 19, 2009, now Pat. No. 8,526,306.

(60) Provisional application No. 61/201,031, filed on Dec. 5, 2008.

(52) U.S. Cl.
CPC ........ *H04L 63/0245* (2013.01); *H04L 63/123* (2013.01); *H04L 63/1408* (2013.01); *H04L 63/20* (2013.01); *H04L 65/1006* (2013.01); *H04L 65/1076* (2013.01); *H04W 4/14* (2013.01)

(56) References Cited

U.S. PATENT DOCUMENTS

| | | | |
|---|---|---|---|
| 9,166,942 B2* | 10/2015 | Jungck | H04L 63/0245 |
| 2002/0124111 A1 | 9/2002 | Desai et al. | |
| 2004/0045010 A1* | 3/2004 | Kondo | G06F 9/465 |
| | | | 719/316 |
| 2004/0245967 A1* | 12/2004 | Nakamura | G05F 1/67 |
| | | | 323/234 |
| 2005/0243846 A1* | 11/2005 | Mallila | G10L 19/005 |
| | | | 370/412 |
| 2005/0273855 A1* | 12/2005 | Oberle | H04L 63/1441 |
| | | | 726/22 |
| 2006/0190612 A1 | 8/2006 | Kahol et al. | |
| 2007/0022479 A1 | 1/2007 | Sikdar et al. | |
| 2007/0053289 A1 | 3/2007 | March et al. | |
| 2008/0060074 A1* | 3/2008 | Okuyama | H04L 63/1441 |
| | | | 726/23 |
| 2008/0127349 A1* | 5/2008 | Ormazabal | H04L 63/1458 |
| | | | 726/25 |
| 2008/0263661 A1* | 10/2008 | Bouzida | H04L 63/1416 |
| | | | 726/22 |
| 2008/0271141 A1 | 10/2008 | Goldman et al. | |
| 2008/0295173 A1* | 11/2008 | Tsvetanov | H04L 63/1425 |
| | | | 726/23 |
| 2009/0252029 A1* | 10/2009 | Daetz | H04L 63/1441 |
| | | | 370/216 |
| 2011/0122827 A1 | 5/2011 | Bjorsell et al. | |

OTHER PUBLICATIONS

Cloudshield Product Datasheet "CS-2000 Content Processing Platform", © 2006 CloudShield Technologies, Inc., 2 pages.
Cloudshield Solutions Software "CloudShield Content Control Suite", © 2006 CloudShield Technologies, Inc., 2 pages.
Goldman, Content Control Suite (CCS), ISP-Planet, Sep. 15, 2006, 2 pgs.
Jungck, "VoIP Fraud: Scenarios and Solutions", Internet Telephony, Jul. 11, 2007, 2 pgs.
Kuthan et al., Tekelec, "SIP: More than you ever wanted to know about" tutorial, Mar. 2007, 242 pgs.
Ludlow, "RTFM: How does SIP work?", Network IT Week, Jul. 31, 2002, pp. 1-5.
McGann et al., "An Analysis of Security Threats and Tools in SIP-Based VoIP Systems", Apr. 7, 2005, 8 pages.
Miliefsky, NetClarity, "Securing Your VoIP™" whitepaper, Oct. 20, 2005, 17 pgs.
Murhammer et al., International Technical Support Organization, "TCP/IP Tutorial and Technical Overview", IBM, http://www.redbooks.ibm.com 6th Ed., Oct. 1998, 737 pgs.
Operations Support Systems—Wikipedia, Aug. 16, 2007, pp. 1-4.
Packetizer®, "SIP" Understanding SIP-Based VoIP version 1.0, Copyright © 2005 2N Telekomunikace, pp. 1-4.
Proulx, "An Introduction to SIP, Part 1: Meet SIP", Feb. 7, 2006, pp. 1-6.
Regular expression, Wikipedia, Aug. 20, 2007, pp. 1-11.
Rik Turner, CloudShield Technologies—News & events—Press Kit, "Cloudshield Responds to Force 10 Criticism", ComputerWire, a DataMonitor Company, Oct. 3, 2006, 1 page.
Service Provider Weekly, "5 Questions with Peder Jungck", Jun. 5, 2006, 3 pgs.
Session Initiation Protocol—Wikipedia, Sep. 3, 2007, pp. 1-6.
SIP—A Technical Overview, © 2007 Avaya, Inc., 1 page.
SIP Requests—Wikipedia, May 5, 2007, 1 page.
SIP Responses—Wikipedia, May 5, 2007, pp. 1-3.
Voice Over IP—Wikipedia, Sep. 1, 2007, pp. 1-12.
VoIP Foro.com—SIP Example: SIP call flow, VoIP Foro © 2006, 1 page.
Web Bug, Wikipedia, Jul. 2007, 4 pages.
WIP Telephony—Wikipedia, Aug. 27, 2007, pp. 1-3.

\* cited by examiner

```
INVITE sip:user_b@cloudshield.com SIP/2.0
Via: SIP/2.0/UDP pc33.usebrinks.com;branch=z9hG4bK776asdhds
Max-Forwards: 70
To: User B <sip:user_b@cloudshield.com>
From: User A <sip:user_a@usebrinks.com>
Call-ID: a84b4c76e66710@pc33.usebrinks.com
CSeq: 314159 INVITE
Contact: <sip:user_a@pc33.usebrinks.com>
Content-Type: application/sdp
Content-Length: 142
```

FIG. 4

IDENTIFICATION OF PATTERNS IN STATEFUL TRANSACTIONS

CROSS-REFERENCE TO RELATED APPLICATIONS

This application is a continuation under 37 C.F.R. § 1.53(b) of U.S. patent application Ser. No. 13/958,174, filed Aug. 2, 2013, which is a continuation under 37 C.F.R. § 1.53(b) of U.S. patent application Ser. No. 12/621,810, filed Nov. 19, 2009. This application also claims the benefit of U.S. Provisional Application No. 61/201,031, filed on Dec. 5, 2008. All applications are incorporated by reference herein.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

TECHNICAL FIELD

The present description relates generally to a system and method, generally referred to as a system, for the identification of patterns in stateful transactions, and more particularly, but not exclusively, to using the identification of patterns in stateful transactions to prevent unauthorized or fraudulent use of a communication network, such as Session Initiation Protocol ("SIP") based voice over internet protocol ("VoIP") communications system.

BACKGROUND

Network based services or transactions, such as those provisioned over the Internet, typically involve multiple interactions between entities, such as a sender and recipient or a user and a service provider, to request or otherwise establish a connection therebetween and implement the service or complete the transaction. Even the mere access of a web site involves a complex suite of interactions between a web browser program and a web server. Such transactions may be for legitimate purposes or they may be for fraudulent or illicit purposes. While the overall transaction being attempted may be one that is fraudulent or otherwise illicit, these interactions, including requests and responses thereto, taken alone may seem innocuous. In particular, one may not even be able to detect that a given transaction is illegitimate until multiple interactions have taken place, the intent then being discernable from the aggregate interactions.

For example, VoIP requires a complex set of interactions between callers, service providers and recipients to set up and implement voice communications therebetween. The use of SIP based VoIP for internet protocol ("IP") telephony services may be increasing in popularity. The increased popularity of SIP based services may be exposing potential vulnerabilities in SIP based VoIP. SIP based VoIP may be particularly susceptible to signal based fraud and denial of service attacks. SIP based VoIP may have inherited the potential for fraud associated with both standard telephony and IP data services. In addition VoIP may be associated with new characteristics which may require protections beyond those available for standard telephony and IP data services. Unfortunately, distinguishing legitimate from fraudulent use of VoIP is difficult as, for example, the initial interactions necessary to establish connections may look identical for both legitimate and fraudulent use with the nature of the use being discernable only after the use has substantially begun or ended.

SUMMARY

A system for the identification of patterns in stateful transactions may include a message interceptor, a message pattern processor, a message handler, and a memory. The message interceptor may be operative to intercept messages transmitted by a first device over a network to a recipient. The messages may be intercepted by the message interceptor before the messages are received by the recipient. The message pattern processor may be operative to add the message to a message pattern and store the message pattern in the memory. The message pattern processor may compare the message pattern to a plurality of exemplary message patterns and identify when the message pattern, or a subset thereof, matches at least one of the exemplary message patterns, or a subset thereof. The message handler may be operative to determine an action to take with respect to the message based on the at least one exemplary message pattern identified by the message pattern processor.

Other systems, methods, features and advantages will be, or will become, apparent to one with skill in the art upon examination of the following figures and detailed description. It is intended that all such additional systems, methods, features and advantages be included within this description, be within the scope of the embodiments, and be protected by the following claims and be defined by the following claims. Further aspects and advantages are discussed below in conjunction with the description.

BRIEF DESCRIPTION OF THE DRAWINGS

The system and/or method may be better understood with reference to the following drawings and description. Non-limiting and non-exhaustive descriptions are described with reference to the following drawings. The components in the figures are not necessarily to scale, emphasis instead being placed upon illustrating principles. In the figures, like referenced numerals may refer to like parts throughout the different figures unless otherwise specified.

FIG. 4 is an exemplary message header in the systems of FIG. 1 and FIG. 2, or other systems for the identification of patterns in stateful transactions.

DETAILED DESCRIPTION

Figure 1:
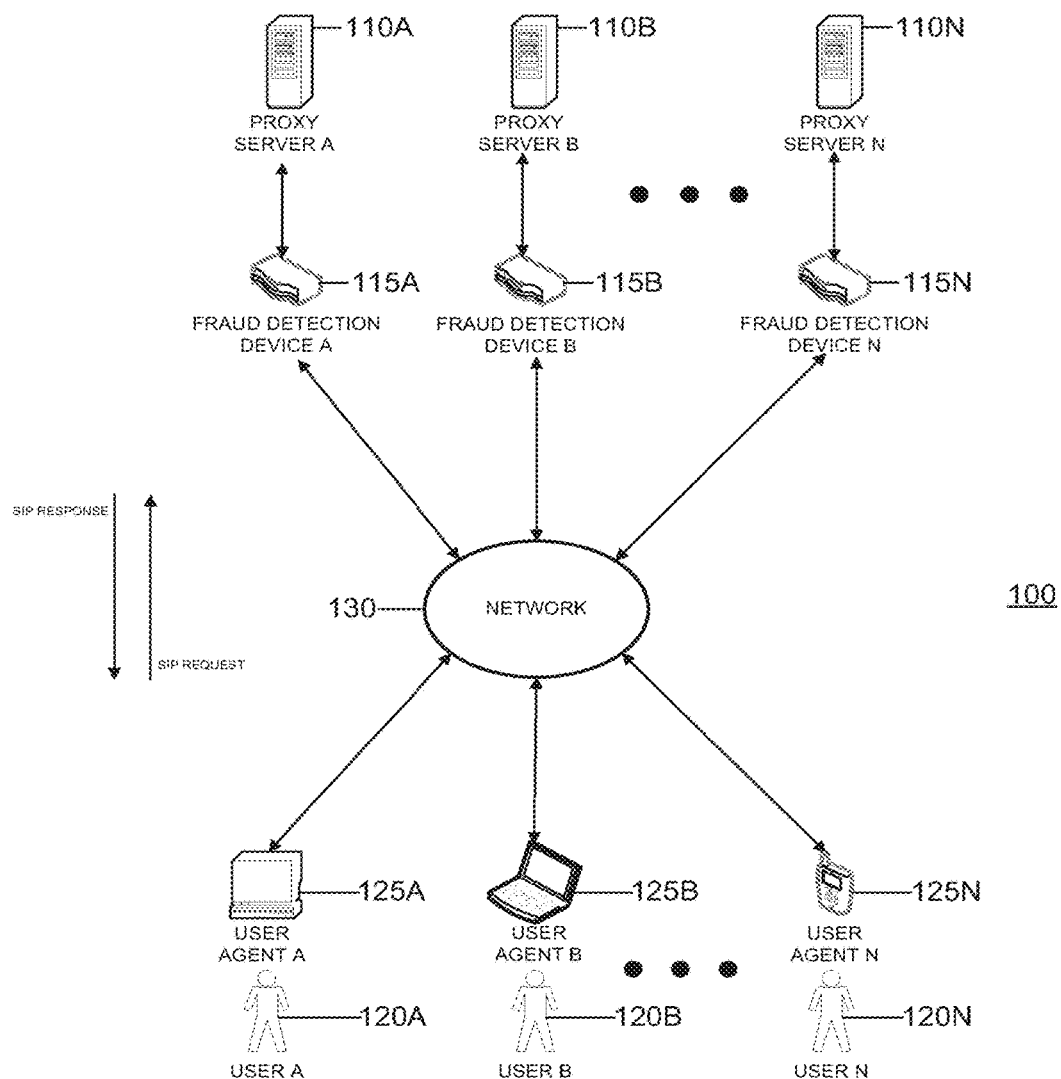
FIG. 1 is a block diagram of a general overview of a system for the identification of patterns in stateful transactions.

A system and method, generally referred to as a system, may relate to the identification of patterns in stateful transactions, and more particularly, but not exclusively, to using the identification of patterns in stateful transactions to prevent unauthorized use of a communication network, such as a SIP based or other protocol based VoIP communications system. The principles described herein may be embodied in many different forms. In one embodiment, the functionality described herein is implemented using a CLOUDSHIELD CS-2000 manufactured by CloudShield Technologies, Inc., located in San Jose, Calif.

The system may enable a service provider to identify patterns in messages communicated between devices as part of stateful transactions therebetween. Messages generally include unsolicited messages, such as a request or data message, unilaterally communicated by a sender to one or more recipients, and solicited messages, such as a response or acknowledgement message, communicated by a recipient of a message, unsolicited or solicited, to the sender thereof and/or another entity based on, or in response to, the received solicited or unsolicited message. The identification of the patterns may assist the service provider to identify irregular, fraudulent/invalid message patterns, non-fraudulent message patterns, and/or generally any exemplary pattern of messages that may be identified by the service provider as being of interest. The service provider may provide exemplary message patterns to the system, such as fraudulent, invalid and/or interesting message patterns. The system may maintain a record of the most recently communicated messages and may compare the most recently communicated messages with the exemplary message patterns. The system may transform the exemplary message patterns into regular expressions, e.g. a string that is used to describe or match a set of strings, according to certain syntax rules. The regular expressions may be used to provide expedient and efficient message pattern comparisons. The system may perform an action based on the result of the message comparisons, such as dropping the most recent message if the current message pattern is indicative of a fraudulent/invalid message pattern, permitting the message to continue to its destination if the current message pattern is indicative of a non-fraudulent/valid message pattern and/or copying or recording the message or forwarding a copy of the message to another device if the current message pattern is in indicative of a message pattern of interest. In one embodiment, the system may learn, such as via a neural network or other machine-learning mechanism, to recognize irregular, fraudulent patterns and/or other patterns of interest.

The system may enable a SIP-based communication sessions provider, such as a SIP based VoIP provider, to prevent unauthorized use of communication services, such as VoIP services. The system may intercept messages in SIP transactions and may identify patterns in the intercepted messages matching exemplary message patterns, such as fraudulent message patterns. The system may enable the provider to identify fraudulent messages, or other indicators of unauthorized use, and handle these indicators, such as by filtering fraudulent messages from the communications network. The filtering of fraudulent messages may prevent unauthorized, or fraudulent, communications sessions, such as VoIP fraud. The system may be able to identify and filter several types of fraudulent or invalid messages, such as duplicate messages, messages which are not in the correct transaction context or transaction state, messages which exceed per channel and per transaction message rate limits, or generally any invalid or unauthorized messages.

The system may be able to protect SIP proxy servers from malicious attacks, such as denial of service attacks, by identifying patterns of messages communicated to/from the proxy servers which may be indicative of a denial of service attack, and handling these messages, such as by blocking the messages from reaching the proxy servers. The service provider may identify an exemplary message pattern indicative of a denial of service attack, such as multiple status messages received for a transaction over a defined period of time, or multiple sessions initiated on a channel over a defined period of time. The system may intercept messages communicated to and/or from the proxy servers, identify the exemplary denial of service message patterns in the messages, and handle the messages accordingly, such as by blocking the messages from reaching the proxy servers. The handling of the messages may function to impose rate limits on the number of status messages received for a transaction over a specified period of time or the number of sessions initiated on a channel over a specified period of time.

FIG. 1 provides a general overview of a system 100 for the identification of patterns in stateful transactions. Not all of the depicted components may be required, however, and some implementations may include additional components. Variations in the arrangement and type of the components may be made without departing from the spirit or scope of the claims as set forth herein. Additional, different or fewer components may be provided.

The system 100 may include a network 130, one or more proxy servers 110A-N, such as a SIP proxy server, one or more fraud detection devices 115A-N, such as a CLOUDSHIELD CS2000™ device, one or more users 120A-N, such as VoIP telephony service customers, and one or more user agents 125A-N, such as a SIP phone. The system 100 may be implemented by a communication session provider, such as a VoIP provider, and may provide SIP-based communication sessions, such as VoIP sessions, with enhanced protection against signal-based fraud and DOS attacks.

SIP may be a lightweight, extensible, text-based protocol designed for initiating, maintaining and terminating interactive communication sessions between users 110A-N, such as voice sessions, video sessions, instant messaging sessions, chat sessions, interactive games, virtual reality, or generally any type of communication session. SIP may work alongside other protocols and standards which may be responsible for providing the level of service required by real-time communication sessions, such as the real-time transport protocol ("RTP").

SIP may generally be used as a signaling mechanism in a communications network. For example, two endpoints, such as the user agent A 125A and the user agent B 125B, may use SIP to negotiate a communication session. SIP may use uniform resource indicators ("URIs") for addressing, or identifying, the user agents 125A-N. The negotiation may be facilitated by a SIP proxy server, such as the proxy servers 110A-N, which may send and receive signals, also referred to as messages, from the user agents 125A-N. The negotiation may include determining a medium for the communication session, such as text, voice, or otherwise, determining the transport, such as the RTP, and determining the encoding of the session. Once the negotiation is completed the user agents 125A-N may interact independently of the proxy servers 110A-N; however, changes to the established negotiation, such as adding video stream to a voice call, or conferencing in a third party, may require further negotiations and facilitation by the proxy servers 110A-N. When the communication session is over, the proxy servers 110A-N may be used by the user agents 125A-N to signal a disconnect.

The user agents 125A-N may be SIP network terminals, or devices, which may include a user agent client and/or a user agent server. The user agents 125A-N may be referred to as client devices 125A-N. The user agent client may be responsible for initiating SIP signaling and the user agent server may be responsible for responding to SIP signaling from a user agent client. The user agents 125A-N may be connected to the network 130 in any configuration that supports data transfer. This may include a data connection to the network 130 that may be wired or wireless. The user agents 125A-N may be a telephone, an IP telephone, a "soft phone," an instant messenger, a cellular phone, or generally any device capable of data communication or any application capable of running on such a device.

A "soft phone" may be a computing application comprising a set of computer executable instructions stored in a computer readable medium. The application may be executed by a computing device which may have a processor, memory, a display, a user interface and a communication interface. The processor may be operatively connected to the memory, display and the interfaces and may perform tasks at the request of the "soft phone" application or the underlying operating system. The memory may be capable of storing data. The display may be operatively connected to the memory and the processor and may be capable of displaying information to a user. The user interface may be operatively connected to the memory, the processor, and the display and may be capable of interacting with a user, such as by sending and/or receiving communications to/from the user. The communication interface may be operatively connected to the memory, and the processor, and may be capable of communicating through the network 130 with the proxy servers 110A-N, and user agents 125-N. The "soft phone" may be programmed in any programming language that supports communication protocols. These languages may include: SUN JAVA®, C++, C#, ASP, SUN JAVASCRIPT®, asynchronous SUN JAVASCRIPT®, or ADOBE FLASH ACTIONSCRIPT®, amongst others.

The proxy servers 125A-N may route signals to/from the user agents 125A-N, authenticate and authorize users 120A-N for services, implement provider call-routing policies, and provide features to users. The a proxy server A 125A may route signals to/from the user agents 125A-N through other proxy servers 125B-N. The proxy servers 125A-N may include a stateful proxy server, a stateless proxy server, a redirect server, a registrar server, or generally any server that may be used in a SIP based system. A stateful proxy server may retain information of all the requests and responses sent to/from the user agents 125A-N. A stateless proxy server may simply pass on requests to/from the user agents 125A-N and may not retain any information. A re-direct server may return a destination address requested by a user agent, such as the user agent A 110A. The user agent A 110A may then use the address to make a request to the destination directly. A registrar server, or location server, may receive registration requests from the user agents 110A-N and may update a data store with the current location/address of the user agents 110A-N.

The fraud detection devices 115A-N may monitor, or intercept, communications between the user agents 125A-N and the proxy servers 110A-N. The intercepted communications may be in the form of Transmission Control Protocol/Internet Protocol ("TCP/IP") packets ("packets"). In this case, the fraud detection devices 115A-N may perform deep packet inspection on the intercepted packets to retrieve, or identify, a message, such as a SIP message, or signal. The fraud detection devices 115A-N may analyze, or process, the message to determine whether the message is fraudulent and/or invalid. If the fraud detection devices 115A-N determine that the message is fraudulent and/or invalid, the fraud detection devices 115A-N may drop the packets, or otherwise prevent the packets from being communicated to the intended destination. If the fraud detection devices 115A-N determine that the message is non-fraudulent, and/or valid, the fraud detection devices 115A-N may forward the packets to the intended destination, or otherwise allow the packets to be communicated to the intended destination.

More detail regarding the aspects of deep packet inspection, as well as the structure, function and operation of inspecting packets to identify a SIP message, as mentioned above, can be found in commonly owned U.S. patent application Ser. No. 11/188,173, filed on Jul. 22, 2005, entitled, "A SYSTEM AND METHOD FOR PROCESSING PACKETS USING LOCATION AND CONTENT ADDRESSABLE MEMORIES," now U.S. Pat. No. 7,330,908, which is hereby incorporated herein by reference in its entirety. The systems and methods herein associated with deep packet inspection may be practiced in combination with methods and systems described in the above-identified patent applications incorporated by reference.

The fraud detection devices 115A-N may store the substantially real-time state of the transactions between the user agents 125A-N in a data store (not shown), such as by storing data describing the messages communicated between the user agents 125A-N and the proxy servers 110A-N as they are communicated. The data, or specification, describing the messages may represent a current message pattern, such as a time-ordered sequence of intercepted messages for a transaction over the network 130 between the user agents 125A-N. In one embodiment, all of the intercepted messages for a given transaction may be maintained. Alternatively, only a subset of messages may be maintained, the number of which may be implementation dependent, whereby as newer messages are received and stored, older messages are deleted.

The fraud detection devices 115A-N may also store exemplary message patterns in the data store. The exemplary message patterns may be data describing valid states and/or state transitions for the system 100 and/or may be data describing message patterns that are known to be valid and/or non-fraudulent. Alternatively, or in addition thereto, the exemplary message patterns may be data describing invalid states and/or state transitions for the system 100 and/or may be data describing message patterns that are known to be invalid and/or fraudulent. The data describing the exemplary message patterns may represent an exemplary time-ordered sequence of messages for a transaction, or portion thereof, on the network 130, the number of which may be implementation dependent and may depend on the number of messages required to substantially discern the nature of the interaction represented thereby. An administrator or expert user may identify and/or define the exemplary message patterns.

In bi- or multi-lateral transactions, the current and exemplary message patterns may describe messages communicated by each participant, i.e. the current and exemplary message patterns may represent bi- or multilateral message patterns. Alternatively, the messages communicated by each participant may be independently represented in unilateral current message patterns and exemplary unilateral message patterns may be maintained as described above. This may allow more granular detection of fraudulent activity. For example, some forms of fraudulent activity may be discernable from the unilateral communications of one participant whereas other forms of fraudulent activity may only be discernable based on the communications of two or more participants.

When a new message is intercepted the data describing the message may be added to the data describing the current message pattern. The current message pattern may then be compared against the exemplary valid message patterns and/or exemplary invalid message patterns. If the current message pattern matches an exemplary valid message pattern, then it may be probable that the current transaction represented by the messages communicated thus far is valid and/or non-fraudulent. The fraud detection devices 115A-N may also impose message rate limits that may limit the number of messages that may be communicated over a period of time on a per channel or per transaction basis. Alternatively or in addition thereto, if the current message pattern matches an exemplary invalid message pattern, then it may be probable that the current transaction represented by the messages communicated thus far is invalid and/or fraudulent.

In one embodiment, it is recognized that transactions are dynamic and that a transaction may initially start out, or at least initially appear, as legitimate and over time, e.g. as more messages are communicated, the transaction may become discernable as fraudulent or invalid, or may in fact change from legitimate to illegitimate, or vice versa. Accordingly, a spectrum of exemplary message patterns may be defined representative of varying probabilities of a given transaction, or portion thereof, being fraudulent or otherwise invalid, from zero probability to substantially likely, based on whether the transaction thus far comprises one or more of these exemplary message patterns. As the transaction progresses, i.e. as the current message pattern is developed and compared against this spectrum of exemplary message patterns, the probability values, e.g. scores, may be determined and tracked based on any matches, such as to identify trends or otherwise predict when a given transaction may morph from one that is legitimate to one that is not. In one implementation, transactions approaching a threshold score may cause a warning or other alert to be issued to the participants, the provider, other entities or a combination thereof. Alternatively, other actions may be taken such as rate limiting the transaction.

In one embodiment, operation of the disclosed system is transparent to network operations. In other words, the operations of the network, such as throughput, remain substantially unaffected by, and/or transparent to one or more of the communicating parties, while one or more of the communicating parties remain substantially unaware of the operations of the disclosed embodiments. In particular, the communicating parties whose conversation may be interrupted or prevented due to the actions described herein, may be unaware of why they are unable to communicate even though they are aware that they are unable to do so. Communicating parties engaged in communications which are not interrupted by the system 100 may remain completely unaware of the operations of the disclosed embodiments.

It will be appreciated by one skilled in the art that the concept/definition of what is "invalid," or "fraudulent," is implementation dependent and may be subjective and vary within the context of the implementation or execution of the disclosed embodiments, within the context of the user's desires, perceptions and/or considerations, and/or within the context of an administrative, governmental, legal or regulatory regime or consideration thereunder, and all such definitions are contemplated. In one embodiment, an interface may be provided which permits the definition, such as through one or more processing rules, of what is considered "valid" and "invalid" or "fraudulent" and "non-fraudulent" or otherwise "of interest", e.g. actionable, by the disclosed embodiments as discussed herein. This interface may be made available to the entity operating the disclosed embodiments, an administrative, government or regulatory actor, the user, or a combination thereof. The interface may further permit definitions of "valid" and "invalid" or "fraudulent" and "non-fraudulent," or otherwise "of interest," on a global and/or user or organizational level whereby the disclosed embodiments operate in accordance with the particular applicable definition on a case by case basis.

The network 130 may include wide area networks (WAN), such as the internet, local area networks (LAN), campus area networks, metropolitan area networks, or any other networks that may allow for data communication. The network 130 may be divided into sub-networks. The sub-networks may allow access to all of the other components connected to the network 130, in the system 100, or the sub-networks may restrict access between the components connected to the network 130. The network 130 may be regarded as a public or private network connection and may include, for example, a virtual private network or an encryption or other security mechanism employed over the public Internet, or the like.

The network 130 may be configured to couple one computing device to another computing device to enable communication of data between the devices. The network 130 may generally be enabled to employ any form of machine-readable media for communicating information from one device to another. The network 130 may include one or more of a wireless network, a wired network, a local area network (LAN), a wide area network (WAN), a direct connection such as through a Universal Serial Bus (USB) port, and the like, and may include the set of interconnected networks that make up the Internet. The network 130 may support any communication method by which information may travel between computing devices.

Figure 10:
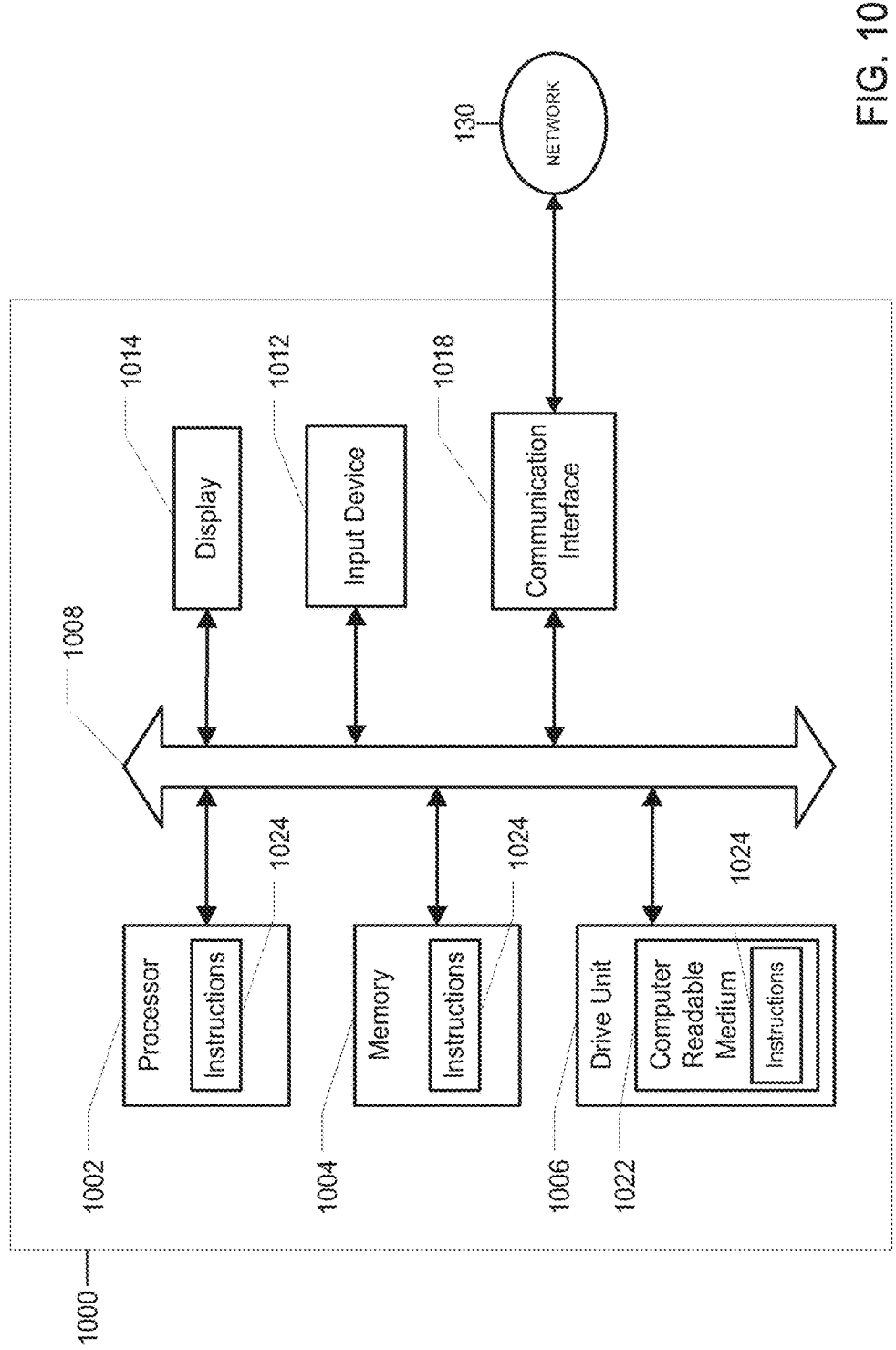
FIG. 10 is an illustration of a general computer system that may be used in the system of FIG. 1 and FIG. 2, or other systems for the identification of patterns in stateful transactions.

The proxy servers 110A-N, the user agents 125A-N, and the fraud detection devices 115A-N may be one or more computing devices of various kinds, such as the computing device in FIG. 10. Such computing devices may generally include any device that may be configured to perform computation and that may be capable of sending and receiving data communications by way of one or more wired and/or wireless communication interfaces. Such devices may be configured to communicate in accordance with any of a variety of network protocols, including but not limited to protocols within the Transmission Control Protocol/Internet Protocol (TCP/IP) protocol suite.

Figure 2:
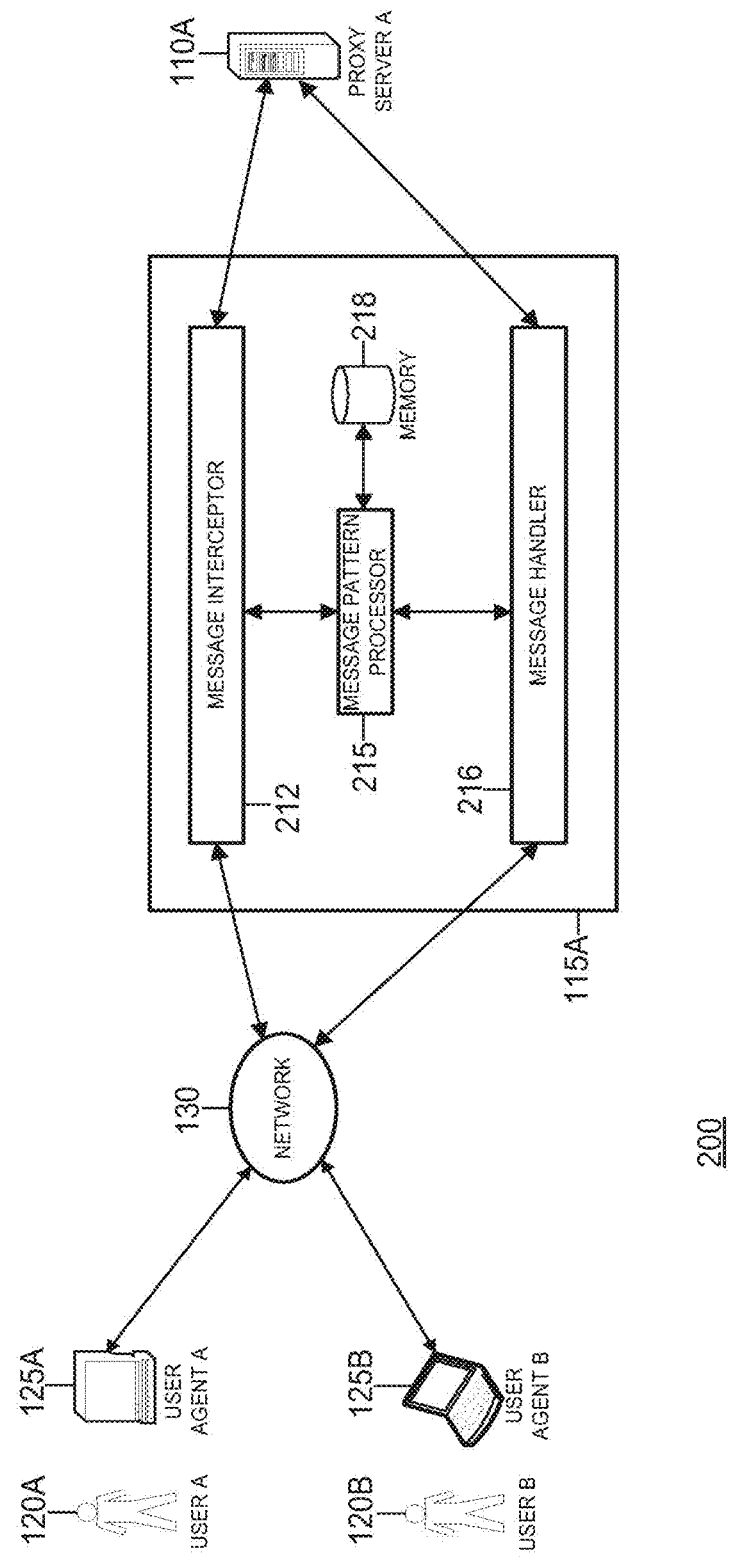
FIG. 2 is a block diagram illustrating the components of a fraud detection device in the system of FIG. 1 or other systems for the identification of patterns in stateful transactions.

FIG. 2 provides a view of the components of a fraud detection device in a system 200 for the identification of patterns in stateful transactions. Not all of the depicted components may be required, however, and some implementations may include additional components. Variations in the arrangement and type of the components may be made without departing from the spirit or scope of the claims as set forth herein. Additional, different or fewer components may be provided.

The system 200 may include a user A 120A, a user agent A 125A, a user B 120B, a user agent B 125B, a network 130, a fraud detection device A 115A, and a proxy server A 110A. The fraud detection device A 115A may include a message interceptor 212, a message pattern processor 215, a message handler 216, and a memory 218.

The message interceptor 212 may be operative to intercept messages transmitted by a first device, such as the client device A 125A, over a network 130 to a recipient, such as the client device B 125B. The messages may be intercepted before they are received by the client device B 125B. The message pattern processor 215 may be operative to add the intercepted messages to a current message pattern, and store the current message pattern in the memory 218. The message pattern processor 215 may compare the current message pattern to a plurality of exemplary message patterns, such as fraudulent message patterns, and identify when the current message pattern matches at least one of the exemplary message patterns. The message handler 216 may be operative to determine an action to take with respect to the message based on the at least one matching exemplary message pattern identified by the message pattern processor 215. In the case of a matching fraudulent message pattern, the message handler 216 may drop the message or otherwise prevent the message from being communicated to the recipient.

The message interceptor 212 may be further operative to intercept a response message sent by the recipient to the first device, such as the client device A 125A, in response to a request message. The message interceptor 212 may intercept the message prior to receipt of the message by the client device A 125A. The message pattern processor 215 may be further operative to add a descriptor representative of the response message to the current message pattern. The message handler 216 may be further operative to take an action with respect to the response message based on the at least one matching exemplary message pattern identified by the message pattern processor 215.

The message interceptor 212 may be further operative to monitor, or intercept, communications, such as requests, between the user agents 125A-B and the proxy server A 110A. The message interceptor 212 may be further operative to monitor, or intercept, communications, such as responses, between the proxy server A 110A and the user agents 125A-B. The message pattern processor 215 may be further operative to process an intercepted packet and identify a SIP message within the packet. The message pattern processor 215 may also be operative to perform content analysis on the message to generate a set of data elements describing the message. The data elements may include a message type describing whether the message is a response or a request, a message code representing a request method code or response status code, a channel identifier ("channel ID"), identifying the channel the message may be associated with, a dialog identifier ("dialog ID"), identifying the dialog of the message may be associated with, and a transaction identifier ("transaction ID") identifying the transaction the message may be associated with. The information used to generate these data elements may be discussed in more detail in FIG. 4.

The message pattern processor 215 may analyze the messages and/or the data elements to determine whether the messages may be fraudulent. Separate analyses may be applied to request messages and response messages. Alternatively or in addition the request messages and response messages may be analyzed together. The data describing the messages, such as the data elements, may be sequentially stored in the memory 218 as a current message pattern. The memory 218 may also be used to store data describing exemplary valid message patterns, exemplary invalid message patterns, data describing historical message patterns, or other data that may be used in determining whether a message is fraudulent. Exemplary valid or invalid message patterns may be identified by administrators or other users familiar with a message pattern that is valid or invalid for the system 100. The current message pattern may then be compared against the exemplary message patterns. The message handler 216 may be operative to handle the messages that match an exemplary message pattern.

The memory 218 may include one or more relational databases or other data stores that may be managed using various known database management techniques, such as, for example, SQL and object-based techniques. Alternatively or in addition the memory 218 may be implemented using one or more of magnetic, optical, solid state or tape drives. Alternatively or in addition the memory 218 may be the CLOUDSHIELD CS2000™ SILICON DATABASE. The CLOUDSHIELD CS-2000™ SILICON DATABASE may provide the benefit of very low latency lookups.

Figure 3:
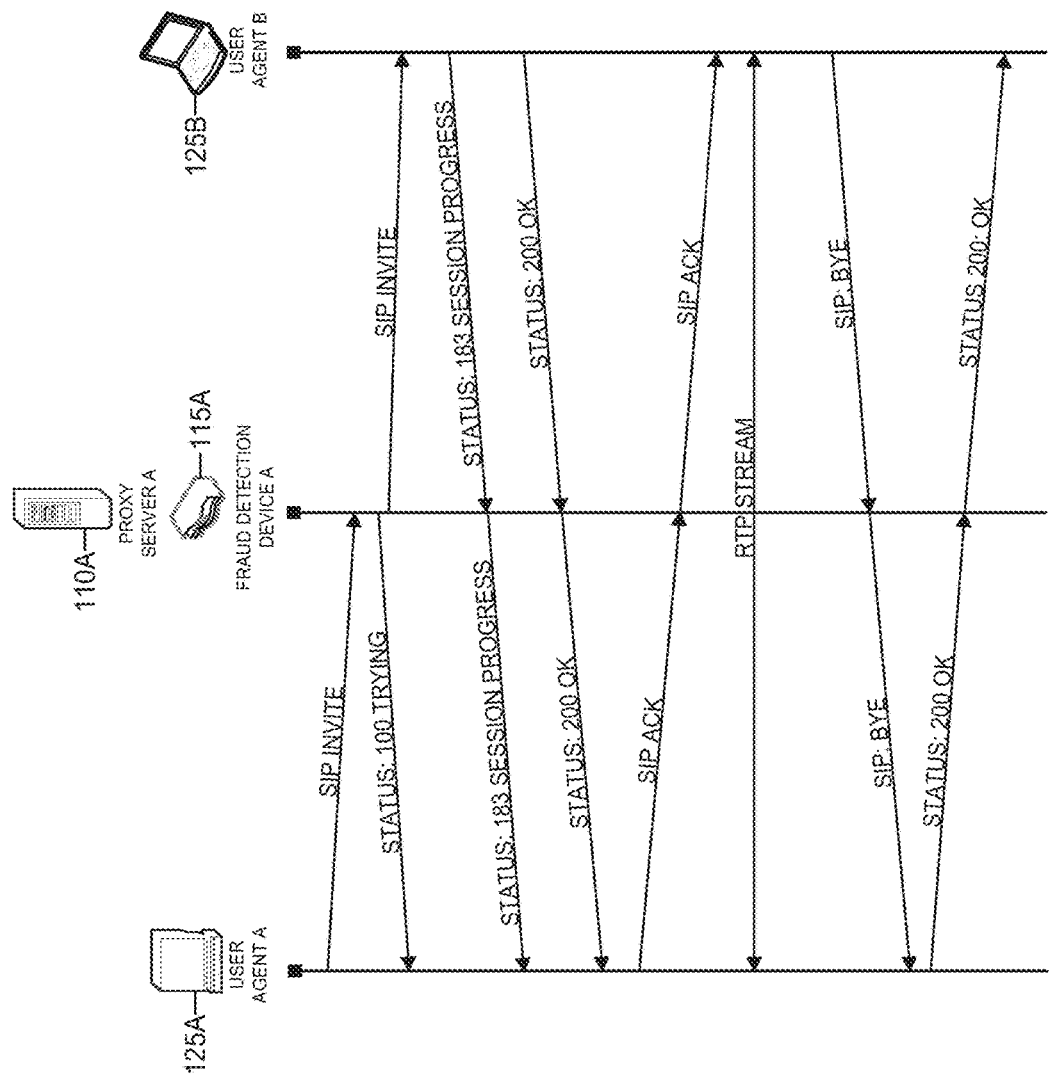
FIG. 3 is an illustration of a valid message pattern, or a valid sequence of messages for a transaction, in the systems of FIG. 1 and FIG. 2, or other systems for the identification of patterns in stateful transactions.

FIG. 3 illustrates a valid message pattern for transactions between a user agent A 125A, a proxy server A 110A and a user agent B 125B, in the systems of FIG. 1 and FIG. 2, or other systems for the identification of patterns in stateful transactions. In FIG. 3 each communication received by, or sent from, the proxy server A 110A may be intercepted and processed by the fraud detection device A 115A. If the fraud detection device A 115A determines that the message is invalid or fraudulent the message may be dropped from the network 130.

In the FIG. 3, the user agent A 125A may send a "SIP INVITE" message to the proxy server A 110A. The "SIP INVITE" message may be a request to establish a communication session with the user agent B 125B. The proxy server A 110A may receive the message and route the message to the user agent B 125B. Alternatively or in addition the proxy server A 110A may route the message to the user agent B 125B through another proxy server, such as the proxy server B 110B. The user agent B 125B may respond to the proxy server A 110A with an informational message indicating the message has been received, such as "STATUS: 183 SESSION PROGRESS." The proxy server A 110A may forward the informational message to the user agent A 125A.

The user agent B 125B may then send a "STATUS: 200 OK" message to the proxy server A 110A. The message may indicate that the request for the communication session has been accepted. The proxy server A 110A may then route the request to the user agent A 125A. The user agent A 125A may respond to the proxy server A 110A with a "SIP ACK" message confirming that the session has been established. The proxy server A 110A may forward the message to the user agent B 125B.

After the communication session has been established, the user agent A 125A and the user agent B 125B may engage in a communication session, such as an RTP stream, independent of the proxy server A 110A. Once the communication session has ended, the user agent B 125B may send a "SIP: BYE" message to the proxy server A 110A. The "SIP: BYE" message may indicate that the communication session has ended and may be disconnected. The proxy server A 110A may forward the message to the user agent A 125A. The user agent A 125A may respond with a "STATUS: 200 OK" message to indicate that the communication session has been terminated. The proxy server A 110A may forward the message to the user agent B 125B.

FIG. 4 is an exemplary SIP message header in the systems of FIG. 1 and FIG. 2, or other systems for the identification of patterns in stateful transactions. A SIP message may be either a response message or a request message. Request messages may be used to initiate an action in the system 100, while response messages may complement a request message and may inform about the result of the action requested.

A SIP message may be comprised of an envelope, or header, which may describe a request, or a result of a request (a response), in the form of a header fields, and an optional payload, or content, which may contain data relating to the request or response. The header may be text, while the content may be text or binary. The data contained in the header may be used by the fraud detection devices 115A-N to determine whether the message may be fraudulent or invalid.

The message in FIG. 4 may represent a "SIP INVITE" request from the user agent A 120A to the user B 120B, as demonstrated in FIG. 3. The first line of the text-encoded request message may contain the method name (INVITE). In a response message the first line may contain a three digit response status code. The lines that follow may be a list of header fields. The example in FIG. 4 may only include a minimum required set of header fields. Alternatively or in addition, a header may include less fields than the example in FIG. 4.

The "Via" header field may include the address, such as "pc33.atlanta.com," at which the user A 120 is expecting to receive responses to this request. It also may include a "branch" parameter that identifies the transaction. The "To" field may include a display name, such as "User B," and a SIP or SIPS URI, such as "sip:user_b@cloudshield.com," towards which the request may have been originally directed. The "From" field may also include a display name, such as "User A" and a SIP or SIPS URI, such as "sip:user_@usebrinks.com," which may indicate the originator of the request.

The "Call-ID" field may include a globally unique identifier for the channel, and may be generated by the combination of a random string and the host name or IP address of the user agent A 125A. The combination of the "To," "From," and "Call-ID," fields may be able to define a peer-to-peer SIP relationship between the user A 120A and the user B 120B, and may be referred to as a dialog.

The "CSeq" field, or Command Sequence, may include an integer and a method name. The CSeq number may be incremented for each new request within a dialog and may be a traditional sequence number. The "Contact" field may include a SIP or SIPS URI which may represent a direct route to contact the user A 110A, usually composed of a username at a fully qualified domain name ("FQDN"). While an FQDN may be preferred, many end systems do not have registered domain names, so IP addresses may be allowed.

While the "Via" header field may inform other SIP elements where to send the response, the "Contact" header field may inform other SIP elements where to send future requests. "Max-Forwards" may serve to limit the number of hops a request may make on the way to its destination. It consists of an integer that may be decremented by one at each hop. "Content-Type" may include a description of the message body (not shown). Content-Length may include an octet (byte) count of the message body.

The data contained in the header fields may be used to generate the message type, message code, channel ID, dialog ID and transaction ID data elements describing the message. The message type data element may be a 32-bit integer representing the message type. A request message may be identified with a 1, and a response message may be identified with a 0. The message type may be identifiable by determining whether the message includes a method name, indicating a request message, or a response status code, indicating a response message. The message code may be a 32-bit integer representing the request method or the response status code.

The channel ID may be a 32-bit integer hash of the IP source address, the IP destination address, the "From" URI and the "To" URI. The "From" URI and the "To" URI may be retrieved from the message header, and the destination and source IP addresses may be retrieved from the TCP/IP packet encapsulating the message.

The dialog ID may be a 32-bit hash of the "Call-ID" URI, which may be identified in the message header. The transaction ID may be a 32-bit hash of the top "Via" URI, the top "Via branch" parameter, and the cSeq parameter, which all may be identified in the message header.

Figure 5:
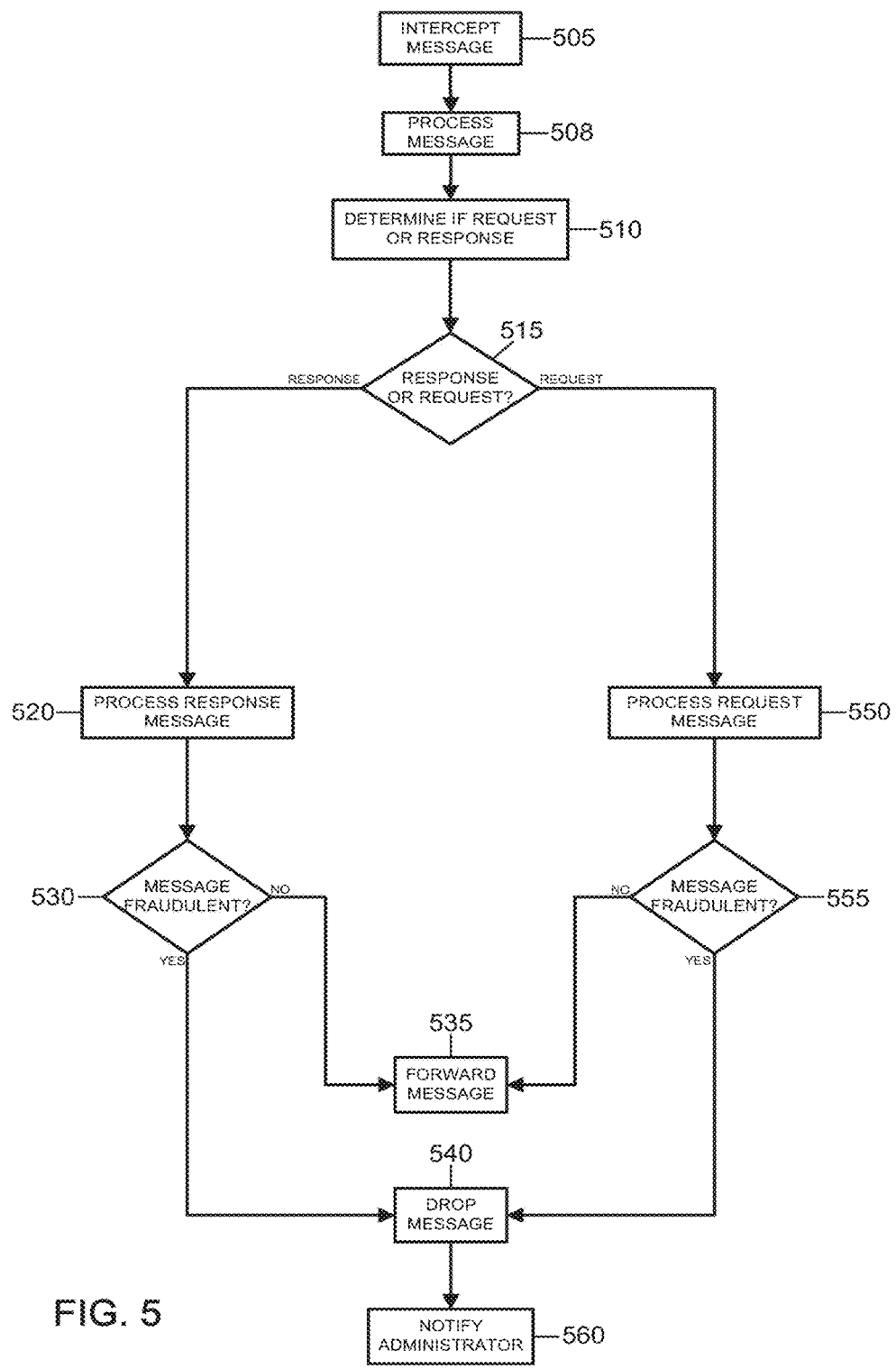
FIG. 5 is a flowchart illustrating the operations of the systems of FIG. 1 and FIG. 2, or other systems for the identification of patterns in stateful transactions.

FIG. 5 is a flowchart illustrating the operations of the systems of FIG. 1 and FIG. 2, or other systems for the identification of patterns in stateful transactions. At block 505, the message interceptor 212 of the fraud detection device A 115A may intercept a message. At block 508 the message pattern processor 215 may process the message to generate the message type, message code, channel ID, dialog ID and transaction ID data elements describing the message. At block 510 the message pattern processor 215 may determine whether the message is a response message or a request message. The message header may be analyzed to determine whether the message includes a request method for a request message, or a response status code for a response message.

If, at block 515, the message is determined to be a response, the system 100 may move to block 520. At block 520 the message pattern processor 215 may process the response message to determine whether the response message is fraudulent and/or should be filtered. A response message may be fraudulent if it contains invalid transaction contexts, invalidates the state of the transaction, or causes a response message rate limit on a transaction basis to be exceeded. The message pattern processor 215 may determine if a response message invalidates the state of the transaction by adding data describing the message, such as the message code, to a current message pattern, and comparing the current message pattern against the exemplary valid message patterns stored in the memory 218. If the current message pattern matches an exemplary valid message pattern then the added message may be valid and/or non-fraudulent. Processing the response message may further include storing the response message in the memory 218. The operations of determining if a response message is fraudulent may be discussed in more detail in FIG. 7.

If, at block 530, the response message is determined to be fraudulent, the system 100 may move to block 540. At block 540 the message handler 216 of the fraud detection device A 115A may drop the response message, such as by preventing the response message from being communicated to the intended destination. The operation of dropping the response message may further include removing the data describing the message from the current message pattern and/or removing the message from the memory 218. At block 560 the fraud detection device A 115A may communicate a notification to an administrator of the system 100. The notification may inform the administrator that there was an attempt to communicate a fraudulent response message over the network 130. The notification may include the fraudulent response message.

If, at block 530, the message is determined to be valid, or non-fraudulent, the system 100 may move to block 535. At block 535 the fraud message handler 216 of the detection device A 115A may forward the response message to the intended destination, or may otherwise allow the response message to be communicated to the intended destination.

If, at block 515, the message is determined to be a request, the system 100 may move to block 550. At block 550 the message pattern processor 215 may process the request message to determine whether the request message is fraudulent. A request message may be fraudulent if the request message is a duplicate message, if the request message is a "BYE", "CANCEL", "REFER", or "UPDATE" request with invalid dialog context, or if the request message causes a request message rate limit on a per channel basis to be exceeded. The request message processing may further include initiating a current message pattern maintaining the state of the transaction and comparing the current message pattern to the exemplary valid message patterns stored in the memory 218. Alternatively or in addition processing the request message may further include storing the request message and the current message pattern in the memory 218. The operations of determining if a request message is fraudulent may be discussed in more detail in FIG. 6.

If, at block 555, the request message is determined to be fraudulent, the system 100 may move to block 540. At block 540 the message handler 216 of the fraud detection device A 115A may drop the request message, such as by preventing the request message from being communicated to the intended destination. The operation of dropping the request message may further include removing the data describing the request message from the current message pattern and/or removing the request from the memory 218. At block 560 the fraud detection device A 115A may communicate a notification to an administrator of the system. The notification may inform the administrator that there was an attempt to communicate a fraudulent response message. The notification may include the fraudulent response message.

If, at block 555, the request message is determined to be valid, or non-fraudulent, the system 100 may move to block 535. At block 535 the fraud detection device A 115A may forward the response message to the intended destination, or may otherwise allow the response message to be communicated to the intended destination.

Figure 6:
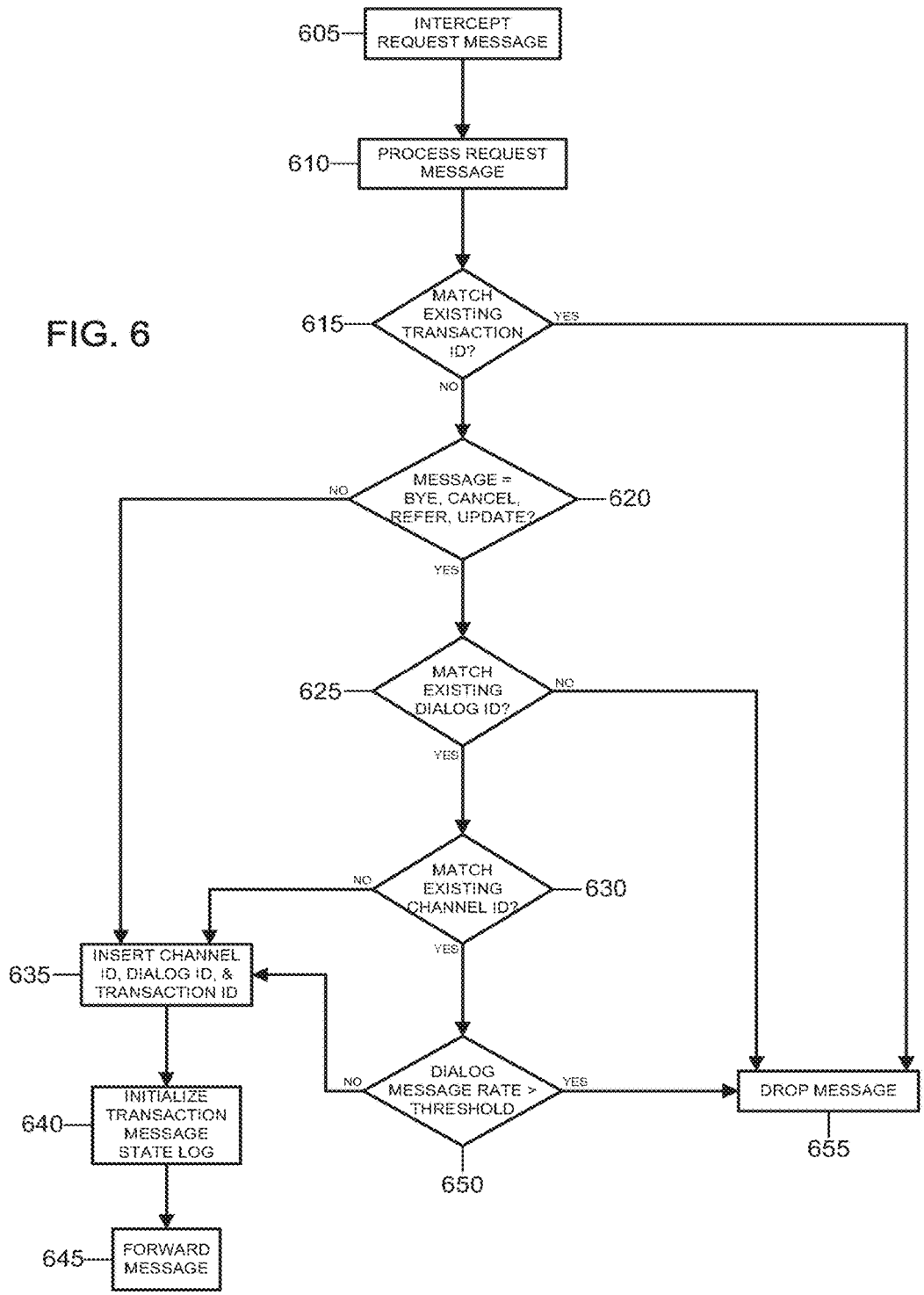
FIG. 6 is a flowchart illustrating the operations of handling a request message in the systems of FIG. 1 and FIG. 2, or other systems for the identification of patterns in stateful transactions.

FIG. 6 is a flowchart illustrating the operations of handling a request message in the systems of FIG. 1 and FIG. 2, or other systems for the identification of patterns in stateful transactions. At block 605 the message interceptor 212 may intercept a request message. At block 610 the message pattern processor 215 may process the message to generate the message type, message code, channel ID, dialog ID and transaction ID data elements describing the message. Alternatively or in addition the message handler 216 may process the message.

At block 615 the message pattern processor 215 may determine whether the transaction ID of the message matches the transaction ID of an existing message in the memory 218. If at block 615 the transaction ID matches the transaction ID of an existing message the message may be a duplicate request message, and the system moves to block 655. At block 655 the duplicate request message may be filtered, or dropped, from the network 130.

If at block 615 the transaction ID does not match an existing transaction ID the system 100 may move to block 620. At block 620 the message handler 216 may determine whether the method of the request message is "BYE," "CANCEL," "REFER," or "UPDATE." If, at block 620, the method of the request message is "BYE," "CANCEL," "REFER," or "UPDATE" the system 100 may move to block 625. At block 625 the system 100 may determine whether dialog ID of the request message matches a dialog ID of a message in the memory 218. This may ensure that the request message is in the correct dialog context. If the dialog ID does not match a dialog ID of a message in the memory 218 then the request message may be fraudulent and the system moves to block 655. At block 655 the out of context request message may be filtered, or dropped, from the network 130.

If, at block 625, the dialog ID matches an existing dialog ID, the system 100 may move to block 630. At block 630 the message pattern processor 215 may determine whether the channel ID of the message matches a channel ID of a message in the data store. If, at block 630, the channel ID does not match a channel ID of a message in the data store the system 100 may move to block 635. At block 635 the message pattern processor 215 may insert the association between the channel ID, dialog ID, and transaction ID into the memory 218. The table structure used to store the messages, the data elements and/or the data describing the messages in the memory 218 may be discussed in more detail in FIG. 8.

The system 100 may then move to block 640. At block 640 the message pattern processor 215 may initialize the transaction message state log and store the transaction message state log in the memory 218. The transaction message state log may store the current pattern of messages received for a given transaction. The current pattern of messages may represent the current time ordered sequence of messages for a transaction between the user agents 125A-N. The current message pattern may be compared against exemplary valid message patterns determine if adding the current message to the current message pattern creates an invalid state. The transaction message state log may be discussed in more detail in FIG. 9. The system 100 may move to block 645 where the message handler 216 may forward the request message to the intended destination, or may otherwise allow the response message to be communicated to the intended destination. The request message may also be stored in the memory 218.

If, at block 620, the method of the request message is not "BYE," "CANCEL," "REFER," or "UPDATE," the system 100 may move to block 635. At block 635 the message pattern processor 215 may insert the association between the channel ID, dialog ID, and transaction ID into the memory 218. The table structure used to store the data in the memory 218 may be discussed in more detail in FIG. 8.

The system 100 may then move to block 640. At block 640 the message pattern processor 215 may initialize the transaction message state log and store the transaction message state log in the memory 218. The transaction message state log may store the current pattern of messages received for a given transaction. The current pattern of messages may be compared against exemplary valid message patterns to determine if adding the current message to the current message pattern creates an invalid state. The transaction message state log may be discussed in more detail in FIG. 9. The system 100 may move to block 645 where the message handler 216 may forward the request message to the intended destination, or may otherwise allow the response message to be communicated to the intended destination. The request message may also be stored in the memory 218.

If at block 630 the channel ID matches the channel ID of a message stored in the memory 218, the system 100 may move to block 650. At block 650 the system 100 may determine the number of dialogs opened for the channel ID identified in the message over a period of time. If the number of dialogs opened over a period of time, such as a second, exceeds a rate limit for the number of dialogs per channel ID per second, the message may be part of a denial of service attack and the system 100 moves to block 655. The rate limit may be set by an administrator of the system. At block 655 the message may be filtered, or dropped, from the network 130. If, at block 650, the number of dialogs opened over a period of time does not exceed a rate limit for the number of dialogs per channel ID per second the system 100 may move to block 635.

At block 635 the message handler 216 may insert the association between the channel ID, dialog ID, and transaction ID into the memory 218. The table structure used to store the data in the memory 218 may be discussed in more detail in FIG. 8.

The system 100 may then move to block 640. At block 640 the message pattern processor 215 may initialize the transaction message state log and store the transaction message state log in the memory 218. The transaction message state log may store the current pattern of messages received for a given transaction. The current pattern of messages may be compared against exemplary valid message patterns to determine if adding the current message to the current message pattern creates an invalid state. The transaction message state log may be discussed in more detail in FIG. 9. The system 100 may move to block 645 where the message handler 216 may forward the request message to the intended destination, or may otherwise allow the request message to be communicated to the intended destination. The request message may also be stored in the memory 218.

Figure 7:
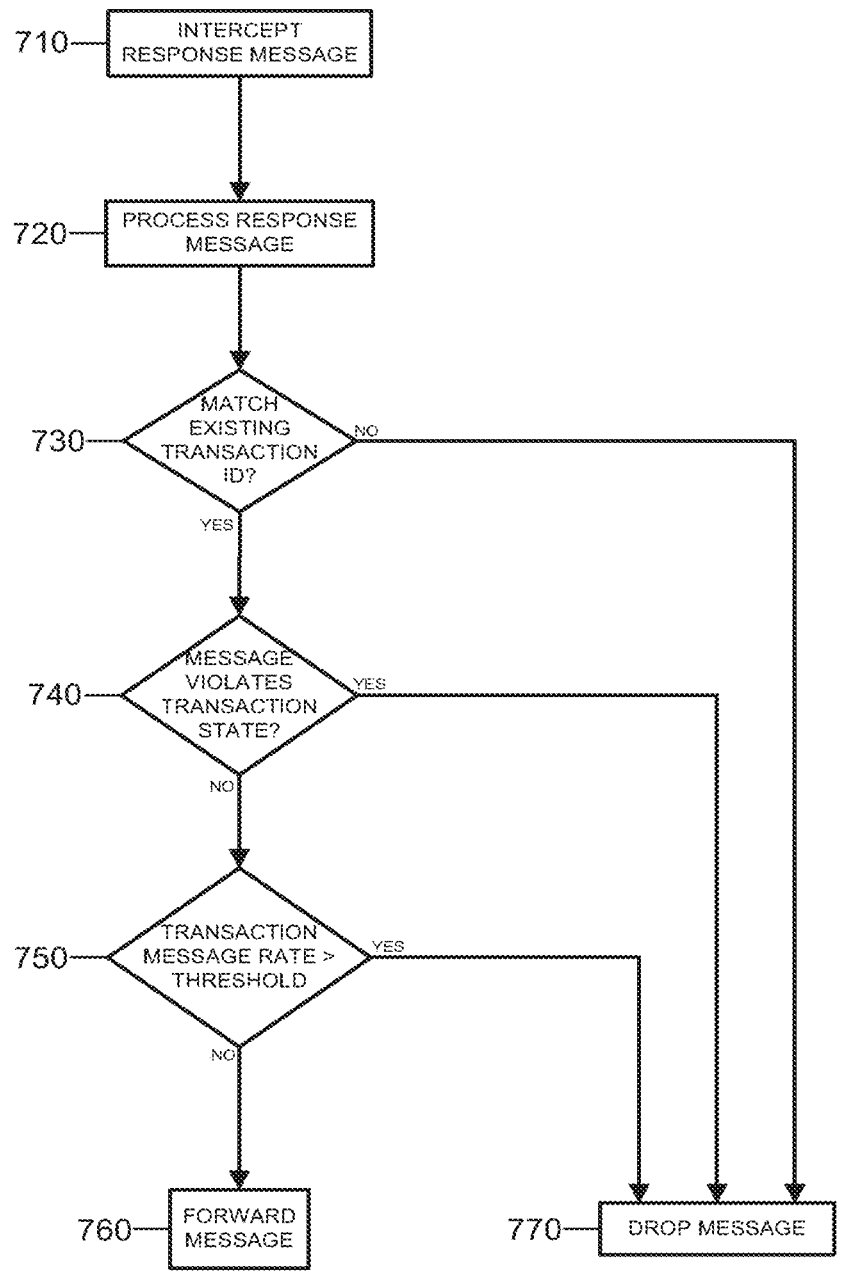
FIG. 7 is a flowchart illustrating the operations of handling a response message in the systems of FIG. 1 and FIG. 2, or other systems for the identification of patterns in stateful transactions.

FIG. 7 is a flowchart illustrating the operations of handling a response message in the systems of FIG. 1 and FIG. 2, or other systems for the identification of patterns in stateful transactions. At block 710 the message interceptor 212 may intercept a response message. At block 720 the message pattern processor 215 may process the response message to generate the message type, message code, channel ID, dialog ID and transaction ID data elements describing the message. Alternatively or in addition the message handler 216 may process the message.

At block 730 the message pattern processor 215 may determine whether the transaction ID of the response message matches the transaction ID of a request message in the memory 218. If, at block 730, the transaction ID does not match a transaction ID of a request message in the data store, then the message may have an invalid transaction context and the system 100 may move to block 770. At block 770 the response message with an invalid transaction context may be filtered, or dropped, from the network 130, because a response message with an invalid transaction context may be fraudulent.

If, at block 730, the message pattern processor 215 determines that the transaction ID of the response message matches the transaction ID of a request in the memory 218, the system 100 may move to block 740. At block 740 the message pattern processor 215 may determine whether the response message violates the transaction state for the transaction identified by the transaction ID of the response message. The message pattern processor 215 may tentatively add the response message to the transaction message state log. The transaction message state log may represent the current pattern of messages for the transaction. The message pattern processor 215 may then compare the current message pattern with exemplary valid message patterns stored in the memory 218. The message pattern processor 215 may utilize a regular expression engine to facilitate comparing the message patterns. The transaction message state log and the regular expression engine may be discussed in more detail in FIG. 9.

If, at block 740 the message pattern processor 215 determines that the message would violate the transaction state, the system 100 may move to block 770. At block 770 the response message may be filtered, or dropped, from the network 130, as a response message that invalidates the transaction state may be fraudulent. The response message may also be removed from the transaction message state log in order to roll back the transaction state and/or the response message may be removed from the memory 218.

If, at block 740, the message pattern processor 215 determines that the message does not violate the transaction state, the system 100 may move to block 750. At block 750 the message pattern processor 215 may determine whether number of messages for the transaction ID received over a period of time, such as a second, exceeds a messages per transaction ID per second rate limit. The rate limit may be determined by an administrator or expert user. If the response message causes number of messages per second to exceed the rate limit, the response message may be part of a denial of service attack and the system 100 may move to block 770. At block 770 the response message may be filtered, or dropped, from the network 130, as the response message may be part of a denial of service attack. The response message may also be removed from the transaction message state log in order to roll back the transaction state, and/or the response message may be removed from the memory 218.

If, at block 750, the response message does not cause the rate limit to be exceeded, the system 100 may move to block 760. At block 760 the message handler 216 may forward the response message to the intended destination, or may otherwise allow the response message to be communicated to the intended destination. The response message may also be stored in the memory 218.

Figure 8:
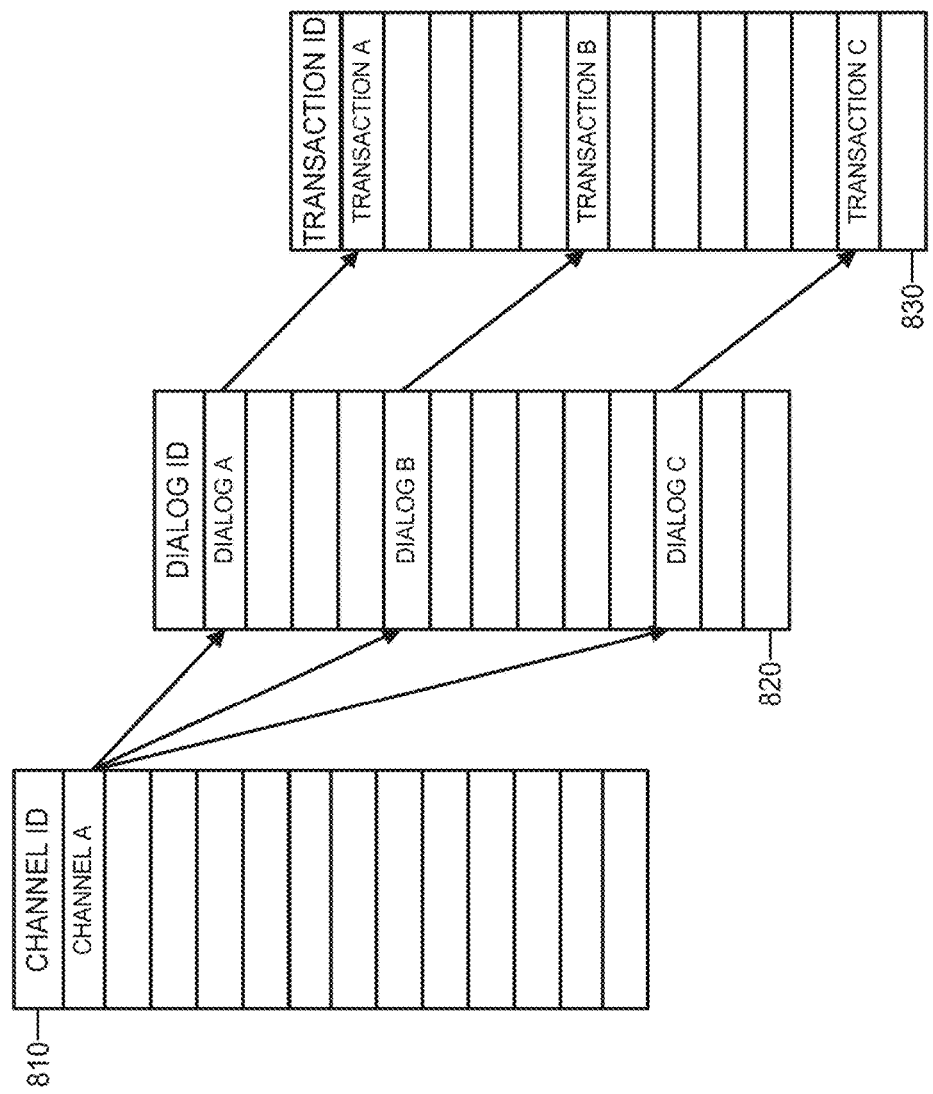
FIG. 8 is an illustration of the relationship between the channel identifier, the dialog identifier, and the transaction identifier in the systems of FIG. 1 and FIG. 2, or other systems for the identification of patterns in stateful transactions.

FIG. 8 illustrates the relationship between the channel identifier, the dialog identifier, and the transaction identifier of a SIP interaction in the systems of FIG. 1 and FIG. 2, or other systems for the identification of patterns in stateful transactions. The relationships between the channel identifier, the dialog identifier and the transaction identifier may facilitate determining whether a message is fraudulent. FIG. 8 may illustrate a channel ID table 810, a dialog ID table 820, and a transaction ID table 830. An entry in the channel ID table, such as "Channel A," may represent a channel opened between one or more user agents 125A-N. Each channel may include one more dialogs between the user agents 125A-N. For example, in FIG. 8 the "Channel A" may include the dialogs represented by "Dialog A," "Dialog B," and "Dialog C" in the dialog ID table 820.

An entry in the dialog ID table 820, such as "Dialog A," may represent a dialog between two user agents 125A-N. Each dialog may include one or more transactions between the user agents 125A-N. For example, in FIG. 8, the "Dialog A," may include the "Transaction A." The "Transaction A" may include one or more messages communicated between the user agents 125A-N over a period of time. The one or more messages of a given transaction may be stored in a transaction message code log table and may represent the current message pattern for the transaction. The transaction message code log table may be discussed in more detail in FIG. 9.

Figure 9:
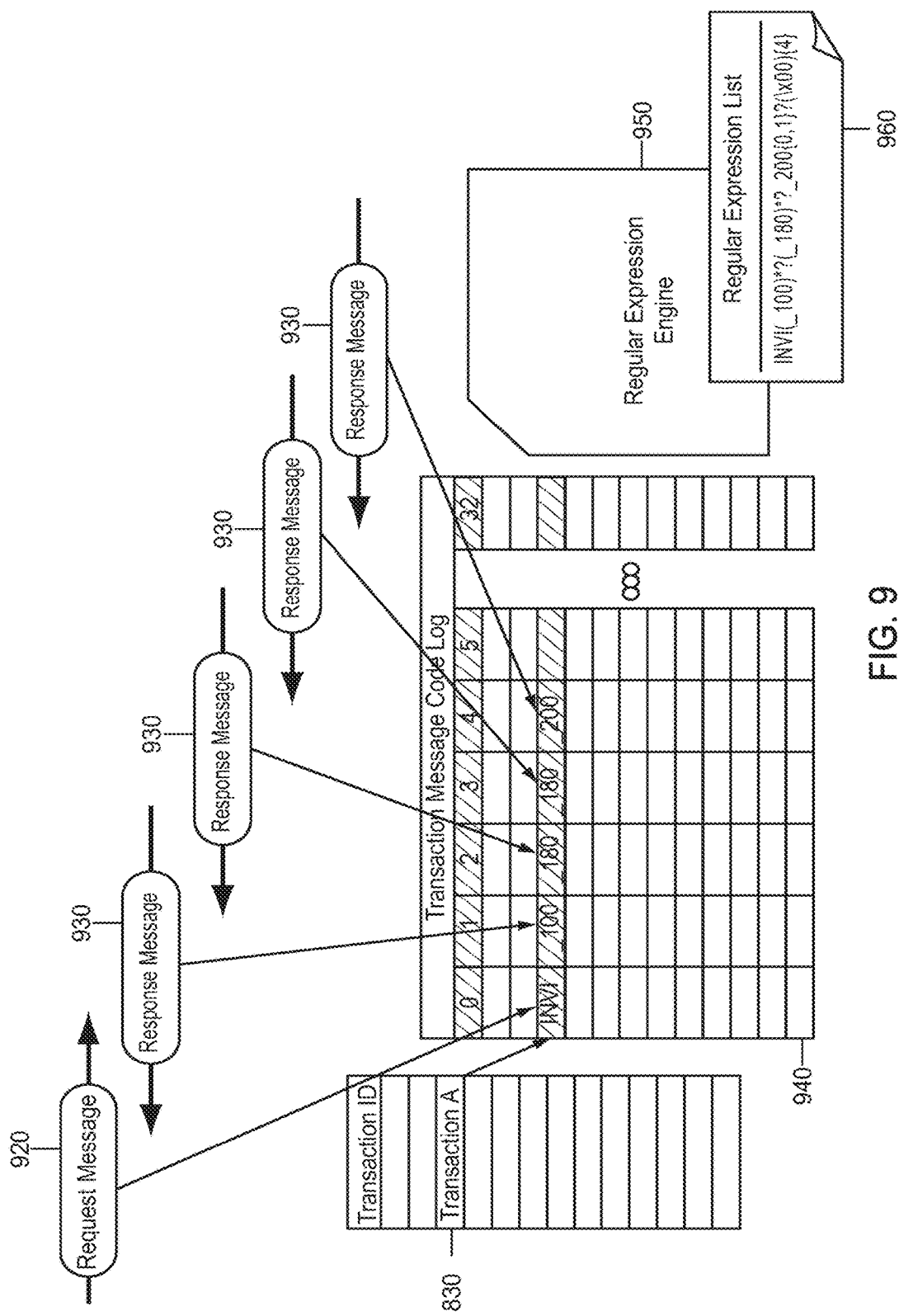
FIG. 9 is an illustration of a transaction message code log in the systems of FIG. 1 and FIG. 2, or other systems for the identification of patterns in stateful transactions.

FIG. 9 illustrates a transaction message code log table 940 used in the systems of FIG. 1 and FIG. 2, or other systems for the identification of patterns in stateful transactions. The transaction message code log table 940 may have an entry for each request message 920 and response message 930 intercepted by the fraud detection device A 115A. Each row in the transaction message code log 940 may represent a current message pattern of a transaction linked to a transaction represented in the transaction ID table 830, such as the "Transaction A." The fraud detection device A 115A may use a regular expression engine 950, such as the regular expression engine in the CLOUDSHIELD CS-2000™, to facilitate comparing the current message pattern with the set of exemplary valid message patterns stored in the memory 218. The regular expression engine in the CLOUDSHIELD CS-2000™ may provide a scalable solution with regard to performance and to the amount of state information that may be validated. The regular expression list 960 may contain regular expressions that may be used to validate the current state of the transaction as identified by the current message pattern. In one embodiment, the regular expression engine 950 comprises an IDT PAXPORT 2500, manufactured by SOLIDUM CORPORATION, located in Scotts Valley, Calif., coupled with a suitably programmed XILINX VERTEX5 FPGA manufactured by XILINX CORPORATION, located in San Jose, Calif.

When the fraud detection device A 115A receives a message, the message may be tentatively added to a row in the transaction message code log table 940 corresponding to the transaction ID of the message. A row of message codes in the transaction message code log table 940 may be a time ordered list of valid messages intercepted by the fraud detection device A 115A. The time ordered messages represented by the message codes may represent the current message pattern of the transaction. The current message pattern may then be compared against exemplary valid or non-fraudulent message patterns. If the current message pattern matches an exemplary valid, or non-fraudulent, message pattern then the message is forwarded to its intended destination. If the current message pattern does not match an exemplary valid, or non-fraudulent, message pattern then the message may be dropped or otherwise prevented from being communicated to the intended destination. The message may also be removed from the transaction message code log table 940 in order to roll back the transaction state, or current message pattern, to the last known good state.

Alternatively or in addition, the system 100 may store exemplary fraudulent and/or invalid message patterns in the memory 218. The current message pattern may be compared against the exemplary fraudulent and/or invalid message patterns to determine if the current message pattern is fraudulent and/or invalid. If the current message pattern matches an exemplary invalid message pattern the message may be dropped and the data representing the message may be removed form the transaction message code log table 940. Further, if the current message pattern is ambiguous, the message may be held or quarantined pending receipt of additional messages which may resolve the ambiguity in matching against the exemplars. Such "quarantining" actions may be implemented in such a way as to avoid substantially impeding message flow, e.g. in situations where subsequent messages are likely to follow despite that the current message has been held up. Once the ambiguity is resolved, quarantined messages may, for example, be released or dropped depending on the resolution. In embodiments which implement functions such as message copying or recording, such quarantining may be used to hold a copy of a message, while the original is permitted to continue on to its destination pending a determination based on subsequent messages. The determination may determine whether the message is part of a conversation of interest and, for example, should then be forwarded to a recording device. This would permit, for example, selective copying/recording of messages.

The exemplary message patterns may be stored in a table similar to the transaction message code log table 940. There may be a table for exemplary valid or non-fraudulent message patterns and exemplary invalid or fraudulent message patterns. The tables may consist of rows of time ordered message codes, representing messages. The rows of data in the tables may be used to generate regular expressions that may be added to the regular expression list 960. The regular expression list 960 may be used to quickly and efficiently determine whether the current message pattern matches any exemplary patterns in the fraudulent or non-fraudulent transaction message code tables.

A regular expression may be an expression that describes a set of strings. Regular expressions may be used to give a concise description of a set, without having to list all of the elements of the set. For example, the set containing the strings "color" and "colour" may be described by the pattern colou?r, or, alternatively it may be said that the pattern matches each of the strings. The precise syntax for regular expressions may vary among tools and context; however, a few examples are presented below. In one embodiment, the syntax of the regular expressions may adhere to the POSIX regular expression format. Alternatively or in addition thereto, regular expressions adhering to the PERL Compatible Regular Expression ("PCRE") regular expression format may be used.

In regular expressions, a vertical bar may separate alternatives. For example gray | grey may match both "gray" and "grey". Brackets "[ ]" matches a single character that is contacted within the brackets. For example [abc] matches "a", "b", or "c". A range of characters can also be specified in brackets, such as [a-z], which may match any lower case letter from "a" to "z". {m, n} may match the preceding element at least m, and not more than n, times. \xnm may match the character defined by the hexadecimal ASCII code nm. Parentheses "( )" may be used to define a subexpression. The string defined with the parentheses can be recalled later with \n.

A quantifier may be used after a character or group to specify how often the preceding element is allowed to occur. The most common quantifiers are '?', '*', and '+'. The question mark, '?', may indicate there are zero or one of the preceding element. For example, ab?c matches both "abc" and "ac". The asterisk, '*', may indicate that there are zero or more of the preceding element. For example ab*c may match "ac", "abc", "abbc", "abbbc", and so on. The plus sign, '+', may indicate that there is one or more of the preceding element. For example, ab+c may match "abc", "abbc", "abbbc", and so on, but not "ac". In another example the regular expression ".*?c=IN.*?IP4.*?(((2[0-4][0-9])|(25[0-5])|(1[0-9]{2}?)|([0-9]{2}?)|([0-9]{1}?)){1}?\.){3}?((2[0-4][0-9])|(25[0-5])|(1[0-9]{2}?)|([0-9]{2}?)|([0-9]{1}?)){1}?" may match "c=IN" followed by "IP4" followed by a valid IP address with only spaces allowed in between.

The regular expressions in the regular expression list 960 may each describe sets of exemplary message patterns. The exemplary message patterns may include descriptors describing each state of the message pattern. In reference to the above examples, a first state of a message pattern may be described as "a", a second state as "b", and a third state as "c". A regular expression may be generated that describes a set of exemplary message patterns, such as non-fraudulent, or valid, message patterns. If the set of exemplary valid message patterns was "abc" and "ac", then the regular expression ab?c may be stored in the regular expression list 960 to identify the exemplary non-fraudulent, or valid, message patterns. The regular expression list 960 may then be used to quickly and efficiently determine whether the current message pattern matches an exemplary message pattern, as represented by a regular expression in the regular expression list 960. In the regular expression list 960 the regular expression "INVI(_100)*?(_180)*?_200{0,1}?(\x00){4}" may describe a set of exemplary message patterns.

FIG. 10 illustrates a general computer system 1000, which may represent one of the SIP proxy servers 110A-N, one of the fraud detection devices 115A-N, one of the SIP user agents 125A-N, or any of the other computing devices referenced herein. Not all of the depicted components may be required, however, and some implementations may include additional components. Variations in the arrangement and type of the components may be made without departing from the spirit or scope of the claims as set forth herein. Additional, different or fewer components may be provided.

The computer system 1000 may include a set of instructions 1024 that may be executed to cause the computer system 1000 to perform any one or more of the methods or computer based functions disclosed herein. The computer system 1000 may operate as a standalone device or may be connected, e.g., using a network, to other computer systems or peripheral devices.

In a networked deployment, the computer system may operate in the capacity of a server or as a client user computer in a server-client user network environment, or as a peer computer system in a peer-to-peer (or distributed) network environment. The computer system 1000 may also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions 1024 (sequential or otherwise) that specify actions to be taken by that machine. In a particular embodiment, the computer system 1000 may be implemented using electronic devices that provide voice, video or data communication. Further, while a single computer system 1000 may be illustrated, the term "system" shall also be taken to include any collection of systems or sub-systems that individually or jointly execute a set, or multiple sets, of instructions to perform one or more computer functions.

As illustrated in FIG. 10, the computer system 1000 may include a processor 1002, such as, a central processing unit (CPU), a graphics processing unit (GPU), or both. The processor 1002 may be a component in a variety of systems. For example, the processor 1002 may be part of a standard personal computer or a workstation. The processor 1002 may be one or more general processors, digital signal processors, application specific integrated circuits, field programmable gate arrays, servers, networks, digital circuits, analog circuits, combinations thereof, or other now known or later developed devices for analyzing and processing data. The processor 1002 may implement a software program, such as code generated manually (i.e., programmed).

The computer system 1000 may include a memory 1004 that can communicate via a bus 1008. The memory 1004 may be a main memory, a static memory, or a dynamic memory. The memory 1004 may include, but may not be limited to computer readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. In one case, the memory 1004 may include a cache or random access memory for the processor 1002. Alternatively or in addition, the memory 1004 may be separate from the processor 1002, such as a cache memory of a processor, the system memory, or other memory. The memory 1004 may be an external storage device or database for storing data. Examples may include a hard drive, compact disc ("CD"), digital video disc ("DVD"), memory card, memory stick, floppy disc, universal serial bus ("USB") memory device, or any other device operative to store data. The memory 1004 may be operable to store instructions 1024 executable by the processor 1002. The functions, acts or tasks illustrated in the figures or described herein may be performed by the programmed processor 1002 executing the instructions 1024 stored in the memory 1004. The functions, acts or tasks may be independent of the particular type of instructions set, storage media, processor or processing strategy and may be performed by software, hardware, integrated circuits, firmware, micro-code and the like, operating alone or in combination. Likewise, processing strategies may include multiprocessing, multitasking, parallel processing and the like.

The computer system 1000 may further include a display 1014, such as a liquid crystal display (LCD), an organic light emitting diode (OLED), a flat panel display, a solid state display, a cathode ray tube (CRT), a projector, a printer or other now known or later developed display device for outputting determined information. The display 1014 may act as an interface for the user to see the functioning of the processor 1002, or specifically as an interface with the software stored in the memory 1004 or in the drive unit 1006.

Additionally, the computer system 1000 may include an input device 1012 configured to allow a user to interact with any of the components of system 1000. The input device 1012 may be a number pad, a keyboard, or a cursor control device, such as a mouse, or a joystick, touch screen display, remote control or any other device operative to interact with the system 1000.

The computer system 1000 may also include a disk or optical drive unit 1006. The disk drive unit 1006 may include a computer-readable medium 1022 in which one or more sets of instructions 1024, e.g. software, can be embedded. Further, the instructions 1024 may perform one or more of the methods or logic as described herein. The instructions 1024 may reside completely, or at least partially, within the memory 1004 and/or within the processor 1002 during execution by the computer system 1000. The memory 1004 and the processor 1002 also may include computer-readable media as discussed above.

The present disclosure contemplates a computer-readable medium 1022 that includes instructions 1024 or receives and executes instructions 1024 responsive to a propagated signal; so that a device connected to a network 130 may communicate voice, video, audio, images or any other data over the network 130. Further, the instructions 1024 may be transmitted or received over the network 130 via a communication interface 1018. The communication interface 1018 may be a part of the processor 1002 or may be a separate component. The communication interface 1018 may be created in software or may be a physical connection in hardware. The communication interface 1018 may be configured to connect with a network 130, external media, the display 1014, or any other components in system 1000, or combinations thereof. The connection with the network 130 may be a physical connection, such as a wired Ethernet connection or may be established wirelessly as discussed below. Likewise, the additional connections with other components of the system 1000 may be physical connections or may be established wirelessly. In the case of the SIP proxy servers 110A-N and SIP user agents 125A-N, the SIP proxy servers 110A-N may communicate with the SIP user agents 125A-N through the communication interface 1018.

The network 130 may include wired networks, wireless networks, or combinations thereof. The wireless network may be a cellular telephone network, an 802.11, 802.16, 802.20, or WiMax network. Further, the network 130 may be a public network, such as the Internet, a private network, such as an intranet, or combinations thereof, and may utilize a variety of networking protocols now available or later developed including, but not limited to TCP/IP based networking protocols.

The computer-readable medium 1022 may be a single medium, or the computer-readable medium 1022 may be a single medium or multiple media, such as a centralized or distributed database, and/or associated caches and servers that store one or more sets of instructions. The term "computer-readable medium" may also include any medium that may be capable of storing, encoding or carrying a set of instructions for execution by a processor or that may cause a computer system to perform any one or more of the methods or operations disclosed herein.

The computer-readable medium 1022 may include a solid-state memory such as a memory card or other package that houses one or more non-volatile read-only memories. The computer-readable medium 1022 also may be a random access memory or other volatile re-writable memory. Additionally, the computer-readable medium 1022 may include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that may be a tangible storage medium. Accordingly, the disclosure may be considered to include any one or more of a computer-readable medium or a distribution medium and other equivalents and successor media, in which data or instructions may be stored.

Alternatively or in addition, dedicated hardware implementations, such as application specific integrated circuits, programmable logic arrays and other hardware devices, may be constructed to implement one or more of the methods described herein. Applications that may include the apparatus and systems of various embodiments may broadly include a variety of electronic and computer systems. One or more embodiments described herein may implement functions using two or more specific interconnected hardware modules or devices with related control and data signals that may be communicated between and through the modules, or as portions of an application-specific integrated circuit. Accordingly, the present system may encompass software, firmware, and hardware implementations.

The methods described herein may be implemented by software programs executable by a computer system. Further, implementations may include distributed processing, component/object distributed processing, and parallel processing. Alternatively or in addition, virtual computer system processing maybe constructed to implement one or more of the methods or functionality as described herein.

Although components and functions are described that may be implemented in particular embodiments with reference to particular standards and protocols, the components and functions are not limited to such standards and protocols. For example, standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

The illustrations described herein are intended to provide a general understanding of the structure of various embodiments. The illustrations are not intended to serve as a complete description of all of the elements and features of apparatus, processors, and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

Although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, may be apparent to those of skill in the art upon reviewing the description.

It will be appreciated by one skilled in the art that the concept/definition of what is "invalid," or "fraudulent," is implementation dependent and may be subjective and vary within the context of the implementation or execution of the disclosed embodiments, within the context of the user's desires, perceptions and/or considerations, and/or within the context of an administrative, governmental, legal or regulatory regime or consideration thereunder, and all such definitions are contemplated. In one embodiment, an interface may be provided which permits the definition, such as through one or more processing rules, of what is considered "valid" and "invalid" or "fraudulent" and "non-fraudulent", or otherwise "of interest," e.g. actionable, by the disclosed embodiments as discussed herein. This interface may be made available to the entity operating the disclosed embodiments, an administrative, government or regulatory actor, the user, or a combination thereof. The interface may further permit definitions of "valid" and "invalid" or "fraudulent" and "not fraudulent," or otherwise "of interest," on a global and/or user or organizational level whereby the disclosed embodiments operate in accordance with the particular applicable definition on a case by case basis.

The Abstract is provided with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments, which fall within the true spirit and scope of the description. Thus, to the maximum extent allowed by law, the scope is to be determined by the broadest permissible interpretation of the following claims and their equivalents, and shall not be restricted or limited by the foregoing detailed description.

We claim:

1. A method of identifying a pattern in messages, the method comprising:
    for each message of a plurality of messages transmitted by a first device to a recipient over a network:
        intercepting the message prior to receipt by the recipient;
        adding a descriptor representative of the message to a message pattern;
        deleting an oldest previously added descriptor from the message pattern when a maximum number of descriptors added to the message pattern is reached; and
        comparing the message pattern to a plurality of exemplary message patterns;
    identifying when the message pattern matches at least one exemplary message pattern of the plurality of exemplary message patterns;
    taking an action with respect to the message based on the identifying;
    determining a probability value of the message pattern being at least part of a fraudulent interaction based on each match of the message pattern, as descriptors are added, with at least one respective exemplary message pattern of the plurality of exemplary message patterns; and
    tracking the probability value of the message pattern being at least part of a fraudulent interaction over the course of the plurality of messages being transmitted by the first device.

2. The method of claim 1, wherein each message of the plurality of messages is at least a portion of a TCP/IP packet.

3. The method of claim 1, wherein the plurality of exemplary message patterns describe, represent, or describe and represent valid states, state transitions for a system including the first device and the recipient, message patterns that are known to be valid, non-fraudulent, or valid and non-fraudulent, invalid states, message patterns that are known to be invalid, fraudulent, or invalid and fraudulent, or any combination thereof.

4. The method of claim 1, wherein the plurality of messages comprises a time-ordered sequence of messages.

5. The method of claim 1, further comprising issuing a warning to the first device, the recipient, or the first device and the recipient when the probability value approaches or exceeds a threshold probability value.

6. The method of claim 1, further comprising rate limiting transmission of a subset of messages of the plurality of messages from the first device to the recipient when the probability value approaches or exceeds a threshold probability value.

7. A system for identifying a pattern in a plurality of messages, the system comprising:
    means for intercepting each message of the plurality of messages transmitted by a first device to a recipient over a network prior to receipt by the recipient, and each response sent by the recipient to the first device in response to the message prior to receipt by the first device;
    means for adding, as each message of the plurality of messages and each response is intercepted, a descriptor representative of the message or the response to a message pattern;
    means for comparing the message pattern to a plurality of exemplary message patterns after each addition;
    means for identifying when the message pattern matches at least one of the exemplary message patterns after each comparison; and
    means for determining an action to take with respect to the message based on the identifying after each identification.

8. The system of claim 7, wherein the message pattern includes descriptors for less than all messages of the plurality of messages transmitted by the first device to the recipient over the network.

9. The system of claim 7, further comprising means for deleting an oldest previously added descriptor from the message pattern when a maximum number of descriptors added to the message pattern is reached.

10. The system of claim 7, wherein the message pattern represents a time ordered sequence of messages and response.

11. The system of claim 7, wherein the plurality of exemplary message patterns describe/represent valid states, state transitions for a system including the first device and the recipient, message patterns that are known to be valid, non-fraudulent, or valid and non-fraudulent, invalid states, message patterns that are known to be invalid, fraudulent, or invalid and fraudulent, or any combination thereof.

12. A system for identifying a pattern in a plurality of messages transmitted over a network, the system comprising:
    a processor coupled with the network and configured to:
        intercept each message of a plurality of messages transmitted by a first device to a recipient over the network prior to receipt by the recipient, and intercept each message of a plurality of messages transmitted by a second device to the recipient over the network prior to receipt by the recipient;
        add, as each message of the plurality of messages transmitted by the first device and the plurality of messages transmitted by the second device is intercepted, a descriptor representative of the message to a message pattern;

compare the message pattern to a plurality of exemplary message patterns after each addition;

identify when the message pattern matches at least one of the exemplary message patterns after each comparison; and determine an action to take with respect to the message based on the identifying after each identification.

13. The system of claim 12, wherein each message of the plurality of messages transmitted by the first device and the plurality of messages transmitted by the second device is at least a portion of a TCP/IP packet.

14. The system of claim 12, wherein the plurality of exemplary message patterns describe/represent valid states, state transitions for a system including the first device and the recipient, message patterns that are known to be valid, non-fraudulent, or valid and non-fraudulent, invalid states, message patterns that are known to be invalid, fraudulent, or invalid and fraudulent, or any combination thereof.

15. The system of claim 12, wherein the processor is further configured to delete an oldest previously added descriptor representing an oldest message included in the message pattern when a maximum number of descriptors added to the message pattern is reached.

16. The system of claim 12, wherein the message pattern represents a time-ordered sequence of messages.

17. The system of claim 12, wherein the processor is further configured to:

determine a probability value of the message pattern being at least part of a fraudulent interaction based on each match of the message pattern, as descriptors are added, with at least one respective exemplary message pattern of the plurality of exemplary message patterns; and tracking the probability value of the message pattern being at least part of a fraudulent interaction over the course of the plurality of messages being transmitted by the first device and the second device.

18. The system of claim 17, wherein the processor is further configured to issue a warning to the first device, the second device, the recipient, or any combination thereof when the probability value approaches or exceeds a threshold probability value.

19. The system of claim 12, wherein the message pattern includes a predetermined maximum number of descriptors representing messages of the plurality of messages transmitted by the first device and the plurality of messages transmitted by the second device.

* * * * *